United States Patent
Sriadibhatla et al.

(10) Patent No.: US 11,909,993 B1
(45) Date of Patent: Feb. 20, 2024

(54) FRACTIONAL MOTION ESTIMATION ENGINE WITH PARALLEL CODE UNIT PIPELINES

(71) Applicant: Meta Platforms, Inc., Menlo Park, CA (US)

(72) Inventors: Kameswara Kishore Sriadibhatla, Dublin, CA (US); Yunqing Chen, Los Altos, CA (US); Junqiang Lan, Fremont, CA (US); Adrian Stafford Lewis, Mountain View, CA (US); Anil Muthiraparampil Sunil, Sunnyvale, CA (US)

(73) Assignee: META PLATFORMS, INC., Menlo Park, CA (US)

( * ) Notice: Subject to any disclaimer, the term of this patent is extended or adjusted under 35 U.S.C. 154(b) by 0 days.

(21) Appl. No.: 17/390,749

(22) Filed: Jul. 30, 2021

(51) Int. Cl.
*H04N 19/436* (2014.01)
*H04N 19/119* (2014.01)
*H04N 19/52* (2014.01)
*H04N 19/43* (2014.01)

(52) U.S. Cl.
CPC ......... *H04N 19/436* (2014.11); *H04N 19/119* (2014.11); *H04N 19/43* (2014.11); *H04N 19/52* (2014.11)

(58) Field of Classification Search
CPC .... H04N 19/436; H04N 19/119; H04N 19/43; H04N 19/52
See application file for complete search history.

(56) References Cited

U.S. PATENT DOCUMENTS

| | | | | |
|---|---|---|---|---|
| 2003/0053544 A1* | 3/2003 | Yasunari | ............... | H04N 5/145 375/E7.122 |
| 2015/0091920 A1* | 4/2015 | Rygh | ....................... | G06T 1/60 345/522 |
| 2015/0181209 A1* | 6/2015 | Holland | ............... | H04N 19/573 375/240.15 |
| 2019/0200039 A1* | 6/2019 | Tanner | ................. | H04N 19/105 |
| 2019/0222858 A1* | 7/2019 | Embar Raghukrishnan | ............... | H04N 19/436 |
| 2022/0070447 A1* | 3/2022 | Hishinuma | ........... | H04N 19/109 |

OTHER PUBLICATIONS

Wang F., et al., "An Efficient Fractional Motion Estimation Architecture for AVS Real-Time Full HD Video Encoder," IEEE International Conference on Imaging Systems and Techniques Proceedings, 2012, 6 pages.*

(Continued)

*Primary Examiner* — Mohammed S Rahaman
(74) *Attorney, Agent, or Firm* — Mannava & Kang, P.C.

(57) ABSTRACT

A video encoder is disclosed. The video encoder comprises an integer level motion estimation hardware component configured to determine candidate integer level motion vectors for a video being encoded. The video encoder comprises a fractional motion estimation hardware component configured to receive the candidate integer level motion vectors from the integer level motion estimation hardware component and refine the candidate integer level motion vectors into candidate sub-pixel level motion vectors. The fractional motion estimation hardware component includes parallel pipelines configured to process coding units of a frame of the video in parallel across the parallel pipelines.

20 Claims, 7 Drawing Sheets

(56) References Cited

OTHER PUBLICATIONS

Goebel J., et al., "High Throughput Multiplierless Architecture for VP9 Fractional Motion Estimation," 31st Symposium on Integrated Circuits and Systems Design (SBCCI), 2018, 6 pages.*

C.-Y. Kao, C.-L. Wu and Y.-L. Lin, "A High-Performance Three-Engine Architecture for H.264/AVC Fractional Motion Estimation," in IEEE Transactions on Very Large Scale Integration (VLSI) Systems, vol. 18, No. 4, pp. 662-666, Apr. 2010, doi: 10.1109/TVLSI.2009.2013629. (YangKao).*

He G., et al., "High-Throughput Power-Efficient VLSI Architecture of Fractional Motion Estimation for Ultra-HD HEVC Video Encoding," IEEE Transactions on Very Large Scale Integration (VLSI), Dec. 2015, vol. 23, No. 12, pp. 3138-3142.

Pakdaman F., et al., "A Low Complexity and Computationally Scalable Fast Motion Estimation Algorithm for HEVC," Multimedia Tools and Applications, Jan. 7, 2020, vol. 79, pp. 11639-11666.

\* cited by examiner

FRACTIONAL MOTION ESTIMATION ENGINE WITH PARALLEL CODE UNIT PIPELINES

BACKGROUND OF THE INVENTION

A video coding format is a content representation format for storage or transmission of digital video content (such as in a data file or bitstream). It typically uses a standardized video compression algorithm. Examples of video coding formats include H.262 (MPEG-2 Part 2), MPEG-4 Part 2, H.264 (MPEG-4 Part 10), HEVC (H.265), Theora, RealVideo RV40, VP9, and AV1. A video codec is a device or software that provides encoding and decoding for digital video. Most codecs are typically implementations of video coding formats.

Recently, there has been an explosive growth of video usage on the Internet. Some websites (e.g., social media websites or video sharing websites) may have billions of users and each user may upload or download one or more videos each day. When a user uploads a video from a user device onto a website, the website may store the video in one or more different video coding formats, each being compatible with or more efficient for a certain set of applications, hardware, or platforms. Therefore, higher video compression rates are desirable. However, with higher compression rates come higher computational complexity; therefore, improved hardware architecture and techniques in video coding would be desirable.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
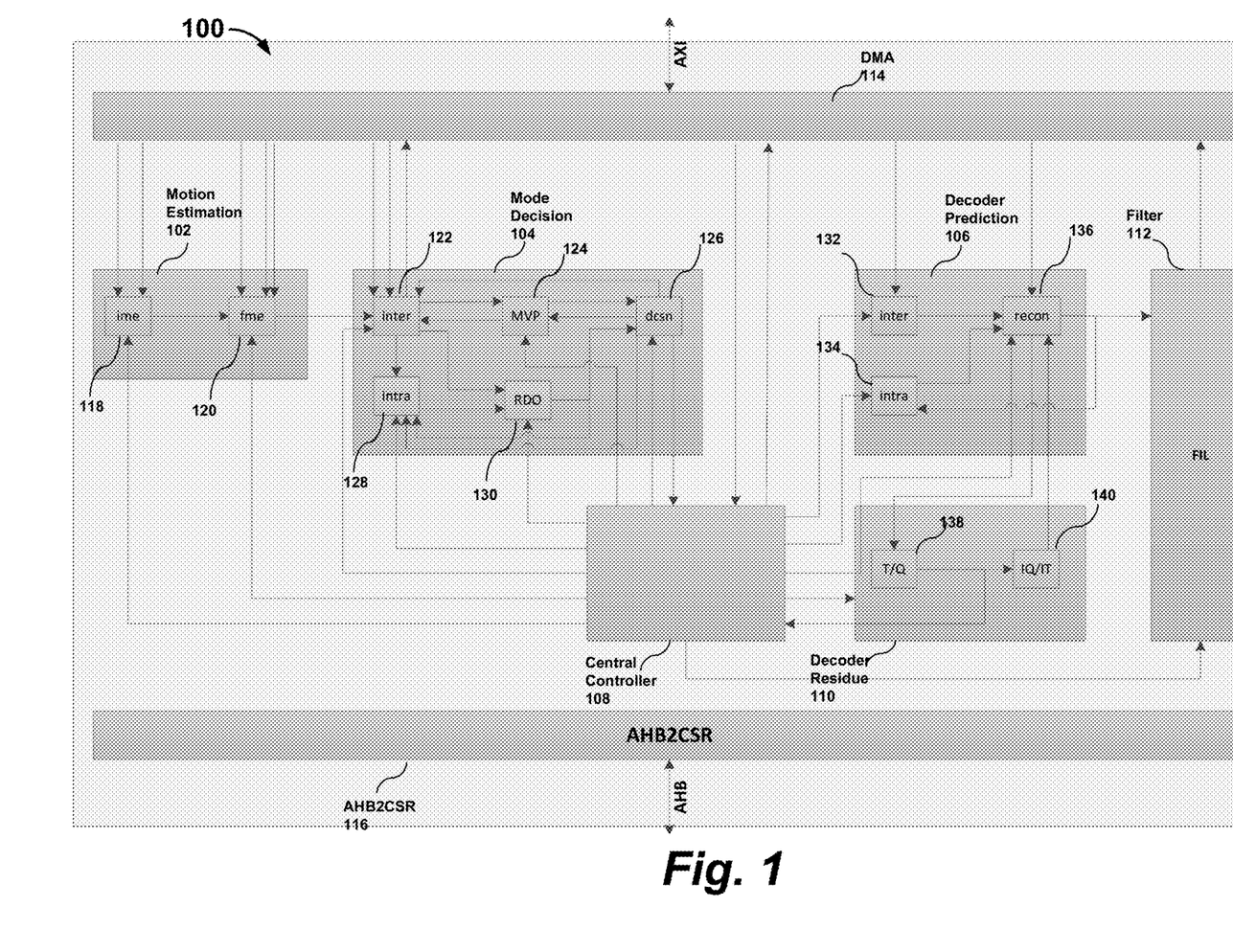
FIG. 1 illustrates a block diagram of an embodiment of a video encoder 100.

FIG. 1 illustrates a block diagram of an embodiment of a video encoder 100. For example, video encoder 100 supports the video coding format AV1 (Alliance for Open Media Video 1). However, video encoder 100 may also support other video coding formats as well, such as H.262 (MPEG-2 Part 2), MPEG-4 Part 2, H.264 (MPEG-4 Part 10), HEVC (H.265), Theora, RealVideo RV40 and VP9.

Video encoder 100 includes many modules. Some of the main modules of video encoder 100 are shown in FIG. 1. As shown in FIG. 1, video encoder 100 includes a direct memory access (DMA) controller 114 for transferring video data. Video encoder 100 also includes an AMBA (Advanced Microcontroller Bus Architecture) to CSR (control and status register) module 116. Other main modules include a motion estimation module 102, a mode decision module 104, a decoder prediction module 106, a central controller 108, a decoder residue module 110, and a filter 112.

Video encoder 100 includes a central controller module 108 that controls the different modules of video encoder 100, including motion estimation module 102, mode decision module 104, decoder prediction module 106, decoder residue module 110, filter 112, and DMA controller 114.

Video encoder 100 includes a motion estimation module 102. Motion estimation module 102 includes an integer motion estimation (IME) module 118 and a fractional motion estimation (FME) module 120. Motion estimation module 102 determines motion vectors that describe the transformation from one image to another, for example, from one frame to an adjacent frame. A motion vector is a two-dimensional vector used for inter-frame prediction; it refers the current frame to the reference frame, and its coordinate values provide the coordinate offsets from a location in the current frame to a location in the reference frame. Motion estimation module 102 estimates the best motion vector, which may be used for inter prediction in mode decision module 104. An inter coded frame is divided into blocks, e.g., prediction units or partitions within a macroblock. Instead of directly encoding the raw pixel values for each block, the encoder will try to find a block similar to the one it is encoding on a previously encoded frame, referred to as a reference frame. This process is done by a block matching algorithm. If the encoder succeeds on its search, the block could be encoded by a vector, known as a motion vector, which points to the position of the matching block at the reference frame. The process of motion vector determination is called motion estimation.

Video encoder 100 includes a mode decision module 104. The main components of mode decision module 104 include an inter prediction module 122, an intra prediction module 128, a motion vector prediction module 124, a rate-distortion optimization (RDO) module 130, and a decision module 126. Mode decision module 104 determines one prediction mode among a number of candidate inter prediction modes and intra prediction modes that gives the best results for encoding a block of video.

Intra prediction is the process of deriving the prediction value for the current sample using previously decoded sample values in the same decoded frame. Intra prediction exploits spatial redundancy, i.e., correlation among pixels within one frame, by calculating prediction values through extrapolation from already coded pixels for effective delta coding. Inter prediction is the process of deriving the prediction value for the current frame using previously encoded reference frames. Inter prediction exploits temporal redundancy.

Rate-distortion optimization (RDO) is the optimization of the amount of distortion (loss of video quality) against the amount of data required to encode the video, i.e., the rate. RDO module 130 provides a video quality metric that measures both the deviation from the source material and the bit cost for each possible decision outcome. Both inter prediction and intra prediction have different candidate prediction modes, and inter prediction and intra prediction that are performed under different prediction modes may result in final pixels requiring different rates and having different amounts of distortion and other costs.

For example, different prediction modes may use different block sizes for prediction. In some parts of the image there may be a large region that can all be predicted at the same time (e.g., a still background image), while in other parts there may be some fine details that are changing (e.g., in a talking head) and a smaller block size would be appropriate. Therefore, some video coding formats provide the ability to vary the block size to handle a range of prediction sizes. The decoder decodes each image in units of superblocks (e.g., 128×128 or 64×64 pixel superblocks). Each superblock has a partition that specifies how it is to be encoded. Superblocks may be divided into smaller blocks according to different partitioning patterns. This allows superblocks to be divided into partitions as small as 4×4 pixels.

Besides using different block sizes for prediction, different prediction modes may use different settings in inter prediction and intra prediction. For example, there are different inter prediction modes corresponding to using different reference frames, which have different motion vectors. For intra prediction, the intra prediction modes depend on the neighboring pixels, and AV1 uses eight main directional modes, and each allows a supplementary signal to tune the prediction angle in units of 3°. In VP9, the modes include DC, Vertical, Horizontal, TM (True Motion), Horizontal Up, Left Diagonal, Vertical Right, Vertical Left, Right Diagonal, and Horizontal Down.

RDO module 130 receives the output of inter prediction module 122 corresponding to each of the inter prediction modes and determines their corresponding amounts of distortion and rates, which are sent to decision module 126. Similarly, RDO module 130 receives the output of intra prediction module 128 corresponding to each of the intra prediction modes and determines their corresponding amounts of distortion and rates, which are also sent to decision module 126.

In some embodiments, for each prediction mode, inter prediction module 122 or intra prediction module 128 predicts the pixels, and the residual data (i.e., the differences between the original pixels and the predicted pixels) may be sent to RDO module 130, such that RDO module 130 may determine the corresponding amount of distortion and rate. For example, RDO module 130 may estimate the amounts of distortion and rates corresponding to each prediction mode by estimating the final results after additional processing steps (e.g., applying transforms and quantization) are performed on the outputs of inter prediction module 122 and intra prediction module 128.

Decision module 126 evaluates the cost corresponding to each inter prediction mode and intra prediction mode. The cost is based at least in part on the amount of distortion and the rate associated with the particular prediction mode. In some embodiments, the cost (also referred to as rate distortion cost, or RD Cost) may be a linear combination of the amount of distortion and the rate associated with the particular prediction mode; for example, RD Cost=distortion+$\lambda$ *rate, where $\lambda$ is a Lagrangian multiplier. The rate includes different components, including the coefficient rate, mode rate, partition rate, and token cost/probability. Other additional costs may include the cost of sending a motion vector in the bit stream. Decision module 126 selects the best inter prediction mode that has the lowest overall cost among all the inter prediction modes. In addition, decision module 126 selects the best intra prediction mode that has the lowest overall cost among all the intra prediction modes. Decision module 126 then selects the best prediction mode (intra or inter) that has the lowest overall cost among all the prediction modes. The selected prediction mode is the best mode detected by mode decision module 104.

After the best prediction mode is selected by mode decision module 104, the selected best prediction mode is sent to central controller 108. Central controller 108 controls decoder prediction module 106, decoder residue module 110, and filter 112 to perform a number of steps using the mode selected by mode decision module 104. This generates the inputs to an entropy coder that generates the final bitstream. Decoder prediction module 106 includes an inter prediction module 132, an intra prediction module 134, and a reconstruction module 136. If the selected mode is an inter prediction mode, then the inter prediction module 132 is used to do the inter prediction, whereas if the selected mode is an intra prediction mode, then the intra prediction module 134 is used to do the intra prediction. Decoder residue module 110 includes a transform and quantization module (T/Q) 138 and an inverse quantization and inverse transform module (IQ/IT) 140.

Fractional Motion Estimation (FME) is performed to refine the motion vectors (MVs) to sub-pixel accuracy, which is a key technique for achieving significant compression gains in different video coding formats, including H.264, VP9, and AV1. Either Quarter-pixel or one-eighth pixel fractional motion estimation is supported depending on the codec type (H.264, VP9, or AV1). However, FME is computationally intensive because it involves interpolation of all sub-pixel samples and computation of their corresponding distortion for multiple prediction units (PU). PU is the most basic unit of prediction and it can be either a square (N×N) or a rectangle (2N×N or N×2N). For example, in H.264, 4×4, 8×8, 16×8, 8×16, and 16×16 PUs are supported. In VP9, 4×4, 8×8, 16×16, 32×16, 16×32, 32×32, 32×64, 64×32, and 64×64 PUs are supported. In addition, H.264 or VP9 video encoding for data center applications has high throughput and quality requirements. For example, for live cases, 4K @ 60 frame per second (fps) is supported. For Video On Demand (VOD) cases, 4K @ 15 fps is supported. Therefore, it would be desirable to design a high throughput, quality preserving FME hardware engine that meets the encoder performance and quality requirements.

In the present application, a video encoder is disclosed. The video encoder comprises an integer level motion estimation hardware component configured to determine candidate integer level motion vectors for a video being encoded. The video encoder further comprises a fractional motion estimation hardware component configured to receive the candidate integer level motion vectors from the integer motion estimation hardware component and refine the candidate integer level motion vectors into candidate sub-pixel level motion vectors, wherein the fractional motion estimation hardware component includes a plurality of parallel pipelines configured to process coding units of a frame of the video in parallel across the plurality of parallel pipelines. The integer level motion estimation hardware component and the fractional motion estimation hardware component may be a part of an application-specific integrated circuit (ASIC).

Figure 2:
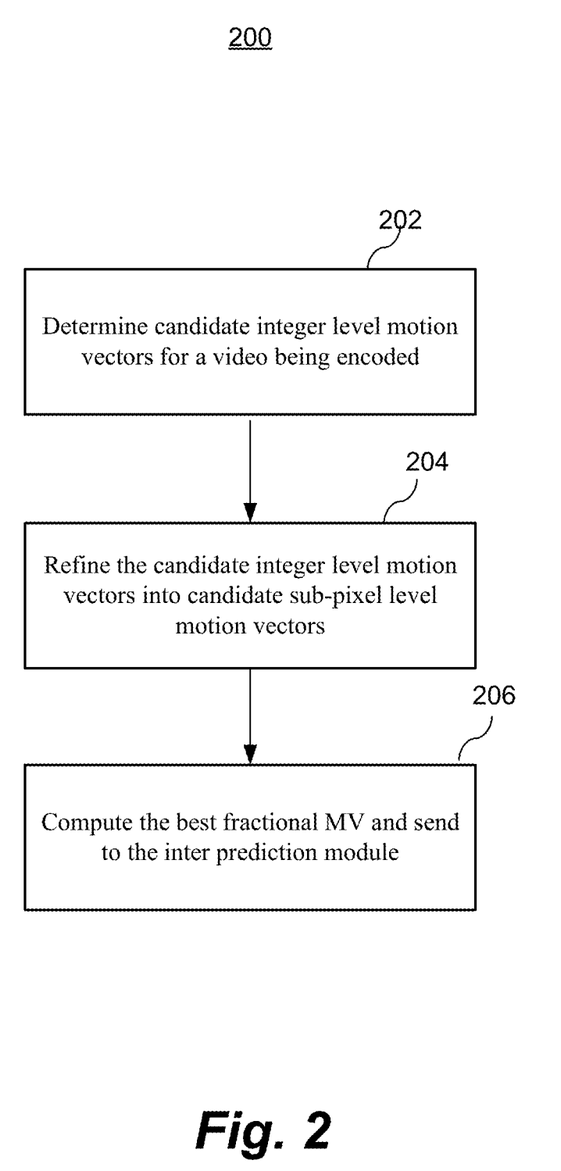
FIG. 2 illustrates an exemplary process 200 for motion estimation.

FIG. 2 illustrates an exemplary process 200 for motion estimation. In some embodiments, process 200 may be performed by motion estimation module 102 in FIG. 1. With continued reference to FIG. 1, motion estimation module 102 includes an integer motion estimation (IME) module 118 and a fractional motion estimation (FME) module 120.

At 202 of process 200, IME module 118 determines candidate integer level motion vectors for each PU and each reference frame and sends the integer MVs to FME module 120. H.264 supports five reference frames and VP9 supports three reference frames.

At 204 of process 200, FME module 120 refines the candidate integer level motion vectors into candidate fractional motion vectors, which are sub-pixel level motion vectors. For example, fractional motion estimation in H.264, VP9, and AV1 supports quarter-pixel or of e-eighth pixel precision.

At 206 of process 200, FME module 120 computes the best fractional MV and sends it to inter prediction module 122 of the mode decision module 104. In particular, FME module 120 performs motion search around the refinement center pointed to by an integer motion vector and further refines the integer motion vector into fractional motion vectors of quarter or one--eighth pixel precision. In some embodiments, FME module 120 interpolates half-pixels, quarter-pixels and one-eighth pixels. Computing all the fractional samples is computationally intensive and consumes a lot of power. Instead, nine positions are searched in both half refinement (one integer-pixel search center pointed to by an integer motion vector and eight half-pixel positions) and then quarter refinement (one best half-pixel position and eight quarter-pixel positions) and finally one-eighth refinement (one best quarter-pixel position and eight one-eighth pixel positions). This approach is more power efficient, and the trade-off is a marginal drop in quality. The position with the minimum residual error is chosen as the best match. If compound prediction/joint search is enabled, FME module 120 averages the samples from two reference frames and finds the best fractional MV based on the averaged samples.

Figure 3:
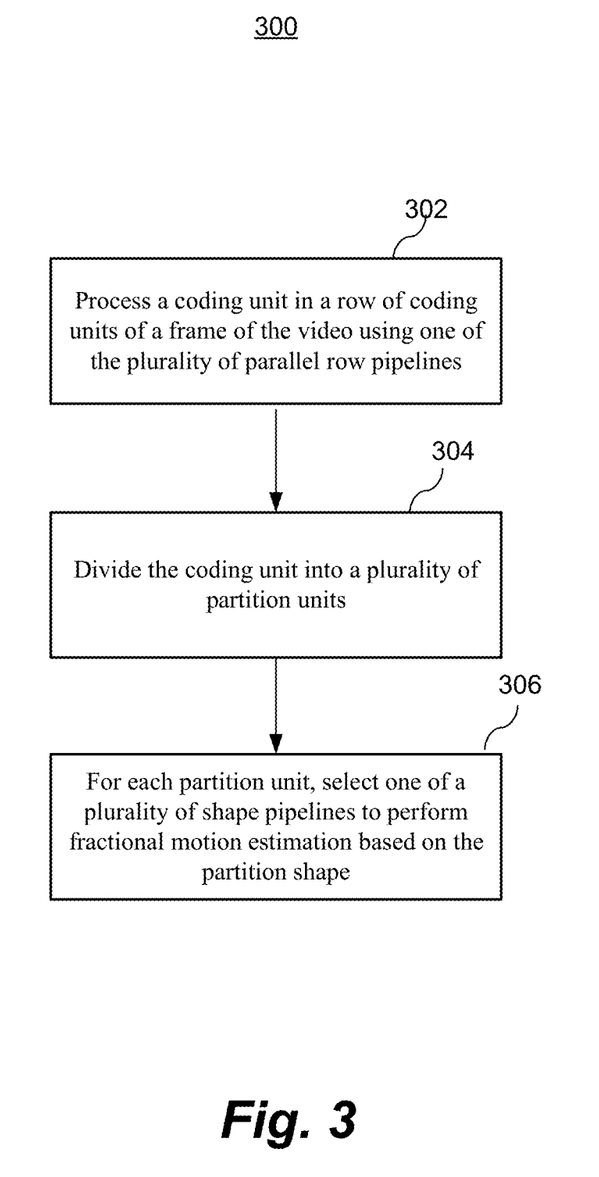
FIG. 3 illustrates an exemplary process 300 for fractional motion estimation.

FIG. 3 illustrates an exemplary process 300 for fractional motion estimation. In some embodiments, process 300 may be performed by FME module 120 in FIG. 1. Because FME is computationally intensive, a highly parallelized pipeline architecture is used to meet the encoder performance and quality requirements.

At step 302, a coding unit in a row of coding units of a frame of the video is processed using one of a plurality of parallel row pipelines. FME module 120 includes a plurality of parallel pipelines configured to process coding units of a frame of the video in parallel across the plurality of parallel pipelines. Each of the parallel pipelines processes a single row of coding units separately from the other parallel pipelines that process other rows of coding units, wherein a coding unit is the maximum size that may be recursively divided into a smaller unit until a proper partition is reached, and wherein each smallest unit is referred to as a prediction unit (PU). For example, in HEVC, each frame is first divided into squares of equal size, i.e., largest coding units (LCUs). In H.264, a coding unit that may be recursively divided into a smaller unit until a proper partition is reached is referred to as a macroblock. In VP9, a coding unit that may be recursively divided into a smaller unit until a proper partition is reached is referred to as a superblock.

Figure 4:
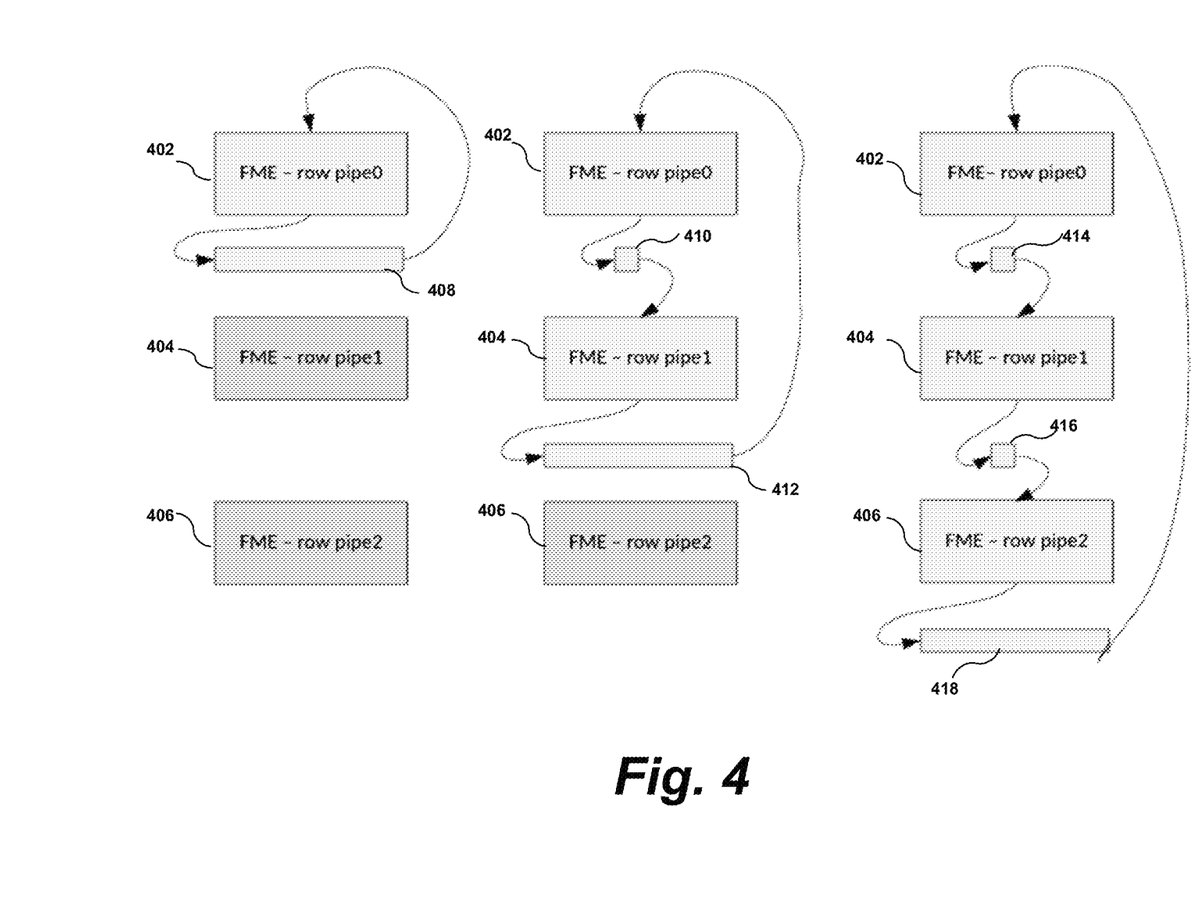
FIG. 4 illustrates an embodiment of a plurality of FME parallel row pipelines configured to process coding units of a frame of the video in parallel across the plurality of parallel pipelines.

FIG. 4 illustrates an embodiment of a plurality of FME parallel row pipelines configured to process coding units of a frame of the video in parallel across the plurality of parallel pipelines. In this embodiment, three parallel row pipelines are used to process coding units of a frame of the video in parallel. The three parallel row pipelines include parallel row pipeline 402, parallel row pipeline 404, and parallel row pipeline 406. Each of the parallel row pipelines processes one row of coding units separately from the other parallel row pipelines. If all three parallel row pipelines 402, 404 and 406 are active, the top neighbor information (e.g., motion vectors) is stored in the buffers 414, 416, and 418. Data in these buffers is written by one parallel row pipeline and read by another parallel row pipeline. Buffers 414 and 416 are shallow buffers, whereas buffer 418 is a full line buffer.

Figure 5:
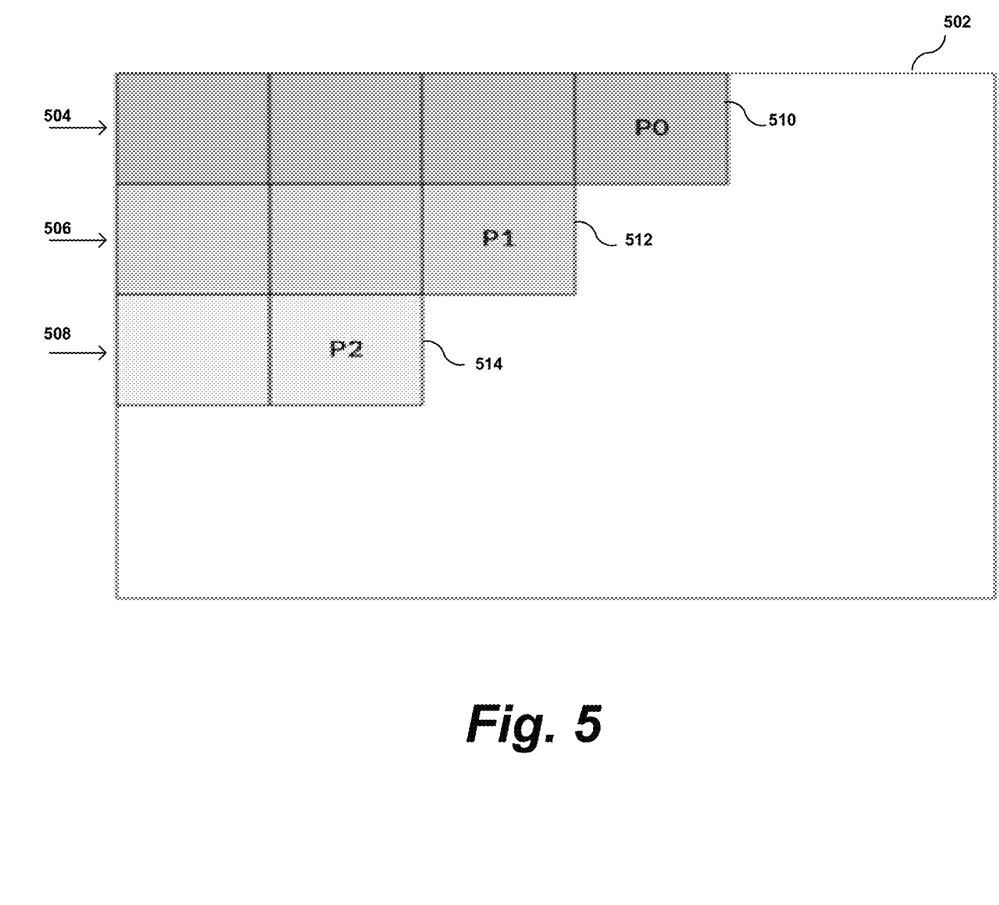
FIG. 5 illustrates an exemplary frame 502 of a video that is divided into a plurality of rows of largest coding units (LCUs).

FIG. 5 illustrates an exemplary frame 502 of a video that is divided into a plurality of rows of largest coding units (LCUs). The first row 504 is processed by parallel row pipeline 402; the second row 506 is processed by parallel row pipeline 404; and the third row 508 is processed by parallel row pipeline 406. In some embodiments, there are data dependencies in processing the coding units across different rows of the video frame. The processing of a row of coding units is in part dependent on the processing of coding units in a previous row of coding units of a video frame. When there are data dependencies, the processing of a certain coding unit in a particular row and column is performed after the processing of another coding unit in a previous row and a particular column is finished. For example, as shown in FIG. 5, any coding units to the right of coding unit 512 in the second row and the third column of video frame 502 are processed after the processing of coding unit 510 in the first row and the fourth column of video frame 502 is finished. Similarly, any coding units to the right of coding unit 514 in the third row and the second column of video frame 502 are processed after the processing of coding unit 512 in the second row and the third column of video frame 502 is finished. Note that the processing of parallel row pipeline 404 is one coding unit behind that of parallel row pipeline 402, and the processing of parallel row pipeline 406 is one coding unit behind that of parallel row pipeline 404.

Figure 6:
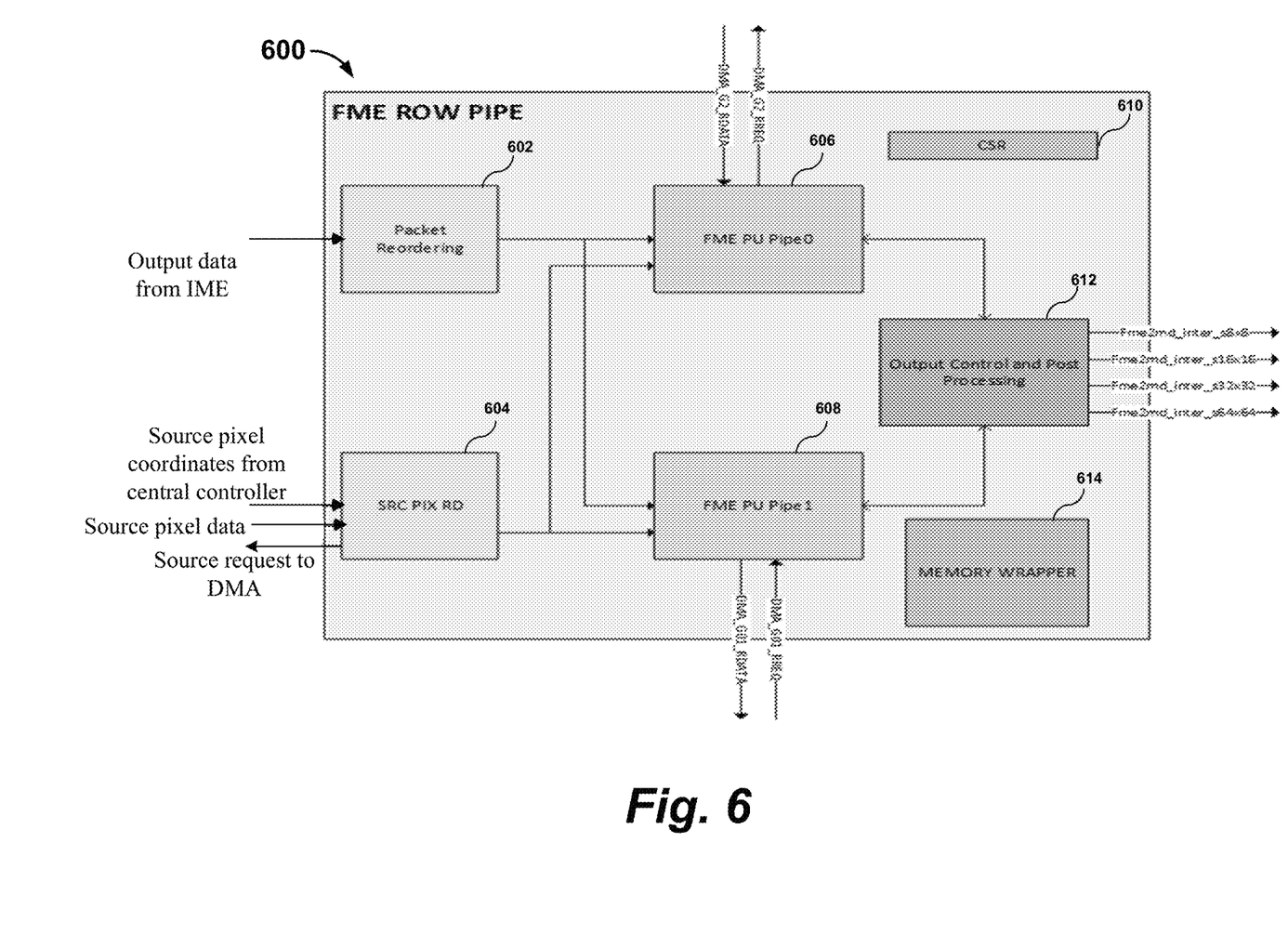
FIG. 6 illustrates an exemplary embodiment of an FME parallel row pipeline 600, which is one of a plurality of FME parallel row pipelines in FME module 120.

FIG. 6 illustrates an exemplary embodiment of an FME parallel row pipeline 600, which is one of a plurality of FME parallel row pipelines in FME module 120. In some embodiments, FME module 120 comprises three FME parallel row pipelines 600.

FME parallel row pipeline 600 includes a packet reordering module 602, a source pixel read module 604, an FME PU pipeline 606, an FME PU pipeline 608, an output control and post processing module 612, a memory wrapper module 614, and a CSR (control and status register) interface 610.

FME parallel row pipeline 600 includes an input buffering and packet reordering module 602 at the input of the FME module 120. A packet defines the region to be processed next. Module 602 is used to buffer the output data from IME module. Module 602 is also used for reordering packets, which is required by the mode decision module 104.

FME parallel row pipeline 600 includes a single source pixel read interface 604. After receiving the packet position packet from central controller 108, a source request is sent to DMA controller 114 to fetch the entire superblock of source pixel data, i.e., 16×16 for H.264 and 64×64 for VP9. For H.264, the neighboring MV and lambda information are also sent from a central controller 108 to FME parallel row pipeline 600. The data is stored in ping pong buffers by source pixel read interface 604.

With continued reference to process 300, at 304, the coding unit is divided into a plurality of PUs. For example, the PUs may include 4×4, 8×8, 16×8, 8×16, 16×16, 16×32, 32×16, 32×32, 32×64, 64×32, and 64×64 PUs.

Figure 7:
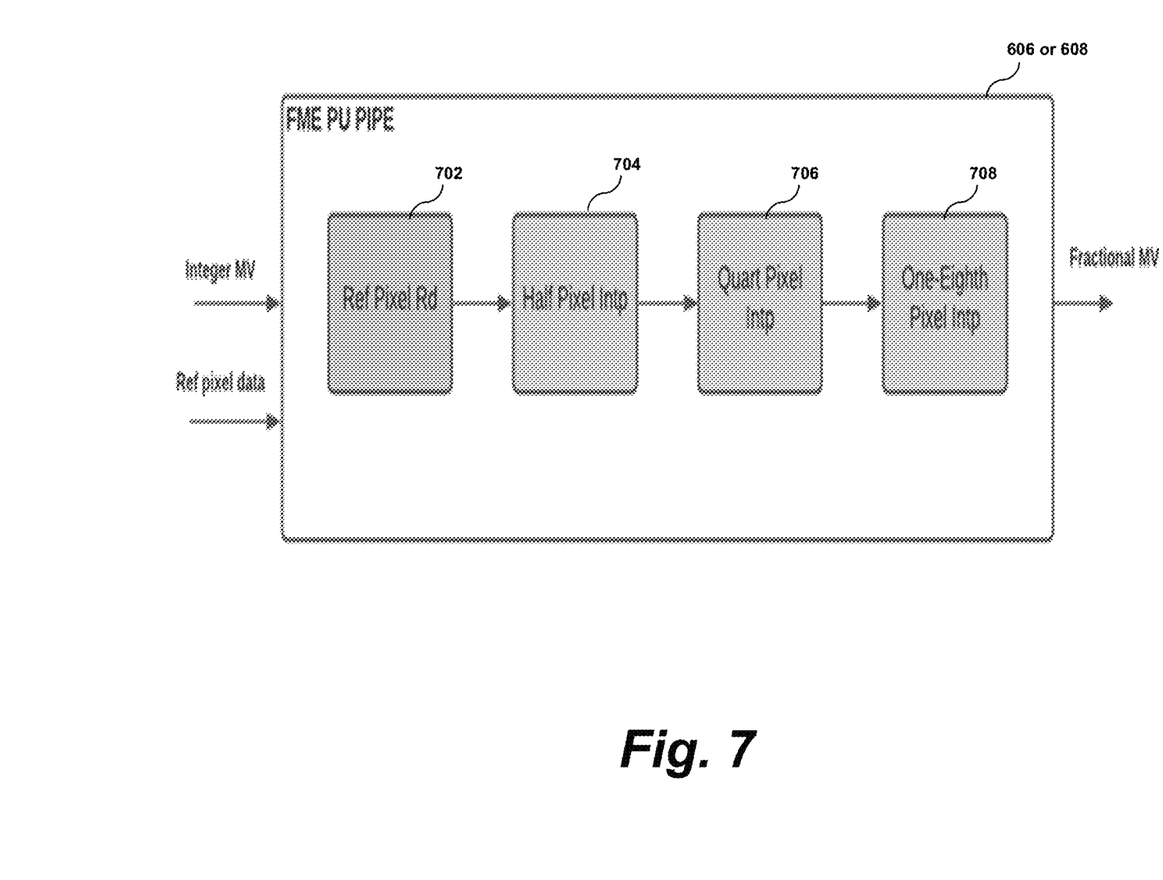
FIG. 7 illustrates one embodiment of a prediction unit pipeline (606 or 608).

At 306, for each PU, one of a plurality of PU pipelines is selected to perform fractional motion estimation based on the type of the PU. FME parallel row pipeline 600 includes one or more parallel PU pipelines (606 and 608). The parallel PU pipelines may process certain PUs in parallel for increased throughput and performance. PU pipeline 606 (also referred to as PU pipe 0) processes the 4×4 and 8×8 PUs, whereas PU pipeline 608 (also referred to as PU pipe 1) processes all the other PUs, including 16×8, 8×16, 16×16, 16×32, 32×16, 32×32, 32×64, 64×32, and 64×64. In some embodiments, the smallest PUs are processed by one parallel PU pipeline, and the remaining larger PUs are processed by another parallel PU pipeline. The processing of the smallest PUs takes more cycles and is less efficient; therefore, they are processed by one of the parallel PU pipelines. FIG. 7 illustrates one example of a PU pipeline (606 or 608). Each of the PU pipelines (606 or 608) receives integer motion vectors and reference pixel data as inputs and provides fractional motion vectors as outputs. Each of the PU pipelines may include a reference pixel read module 702, a pipelined half pixel interpolation module 704, a quarter pixel interpolation module 706, a one-eighth pixel interpolation module 708, and cost computation sub modules. In some embodiments, nine positions are searched in half refinement (one integer-pixel search center pointed to by an integer motion vector and eight half-pixel positions) and then quarter refinement (one half-pixel position and eight quarter-pixel positions) and finally one-eighth refinement one quarter-pixel position and eight one-eighth pixel positions). The position with the minimum residual error is chosen as the best match. The outputs of PU pipeline 606 and PU pipeline 608 are sent to output control and post processing module 612. After the post processing is done by output control and post processing module 612, its output is sent to inter prediction module 122 of the mode decision module 104.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   an integer level motion estimation hardware component configured to determine candidate integer level motion vectors for a video being encoded; and
   a fractional motion estimation hardware component configured to:
   receive the candidate integer level motion vectors from the integer level motion estimation hardware component;
   divide the candidate integer level motion vectors from the integer level motion estimation hardware component into a plurality of groups, wherein each group of the plurality of groups corresponds to a different single row of coding units of the frame of the video; and
   process a group of the plurality of groups by one of a plurality of parallel row pipelines, wherein a parallel row pipeline is configured to process in parallel with other parallel row pipelines a different single row of coding units of the frame of the video, and wherein the plurality of parallel pipelines refine the candidate integer level motion vectors into candidate sub-pixel level motion vectors.

2. The system of claim 1, wherein the fractional motion estimation hardware component is further configured to compute a fractional motion vector and send the fractional motion vector to an inter prediction module of a mode decision module.

3. The system of claim 1, wherein a coding unit of the frame of the video comprises a largest coding unit that may be divided into smaller prediction units.

4. The system of claim 1, wherein in the event of data dependencies in processing the coding units across different rows of coding units of the frame of the video, the processing of a certain coding unit in a particular row and column is performed after the processing of another coding unit in a previous row and a particular column is finished by a different parallel pipeline.

5. The system of claim 1, wherein a parallel pipeline comprises parallel partition unit pipelines, and wherein a partition unit pipeline is configured to process in parallel with the other partition unit pipelines different partition units, and wherein the partition unit pipeline is configured to process a different set of partition units.

6. The system of claim 5, wherein a first parallel partition unit pipeline is configured to process partition units with the smallest partition unit shapes, and wherein a second parallel partition unit pipeline is configured to process partition units with the remaining larger partition unit shapes.

7. The system of claim 5, wherein a parallel partition unit pipeline comprises pipelined half pixel interpolation, quarter pixel interpolation, and one-eighth pixel interpolation for refining the candidate integer level motion vectors into the candidate sub-pixel level motion vectors.

8. The system of claim 7, wherein nine positions are searched in a half-pixel refinement, and wherein nine positions are searched in a quarter-pixel refinement, and wherein nine positions are searched in a one-eighth-pixel refinement.

9. The system of claim 8, wherein the half-pixel refinement comprises searching one integer-pixel search center pointed to by an integer motion vector and eight half-pixel positions in half pixel interpolation, and wherein the quarter-pixel refinement comprises searching one half-pixel position and eight quarter-pixel positions in quarter pixel interpolation, and wherein the one-eighth-pixel refinement comprises searching one quarter-pixel position and eight one-eighth-pixel positions in one-eighth pixel interpolation.

10. A system, comprising:
a processor configured to:
   determine candidate integer level motion vectors for a video being encoded;
   divide the candidate integer level motion vectors into a plurality of groups, wherein each group of the plurality of groups corresponds to a different single row of coding units of the frame of the video; and
   process a group of the plurality of groups by one of a plurality of parallel row pipelines, wherein a parallel row pipeline is configured to process in parallel with other parallel row pipelines a different single row of coding units of the frame of the video, and wherein the plurality of parallel pipelines refine the candidate integer level motion vectors into candidate sub-pixel level motion vectors; and
a memory coupled to the processor and configured to provide the processor with instructions.

11. A method of encoding a video, comprising:
determining candidate integer level motion vectors for the video being encoded; and
dividing the candidate integer level motion vectors into a plurality of groups, wherein each group of the plurality of groups corresponds to a different single row of coding units of the frame of the video; and
processing a group of the plurality of groups by one of a plurality of parallel row pipelines, wherein a parallel row pipeline is configured to process in parallel with other parallel row pipelines a different single row of coding units of the frame of the video, and wherein the plurality of parallel pipelines refine the candidate integer level motion vectors into candidate sub-pixel level motion vectors.

12. The method of claim 11, further comprising computing a fractional motion vector and sending the fractional motion vector to an inter prediction module of a mode decision module.

13. The method of claim 11, wherein a coding unit of the frame of the video comprises a largest coding unit that may be divided into smaller prediction units.

14. The method of claim 11, wherein in the event of data dependencies in processing the coding units across different rows of coding units of the frame of the video, processing a certain coding unit in a particular row and column after the processing of another coding unit in a previous row and a particular column is finished by a different parallel pipeline.

15. The method of claim 11, wherein a parallel pipeline comprises parallel partition unit pipelines, and wherein a partition unit pipeline is configured to process in parallel with the other partition unit pipelines different partition units, and wherein the partition unit pipeline is configured to process a different set of partition units.

16. The method of claim 15, wherein a first parallel partition unit pipeline is configured to process partition units with the smallest partition unit shapes, and wherein a second parallel partition unit pipeline is configured to process partition units with the remaining larger partition unit shapes.

17. The method of claim 15, wherein a parallel partition unit pipeline comprises pipelined half pixel interpolation, quarter pixel interpolation, and one-eighth pixel interpolation for refining the candidate integer level motion vectors into the candidate sub-pixel level motion vectors.

18. The method of claim 17, wherein nine positions are searched in a half-pixel refinement, and wherein nine positions are searched in a quarter-pixel refinement, and wherein nine positions are searched in a one-eighth-pixel refinement.

19. The method of claim 18, wherein the half-pixel refinement comprises searching one integer-pixel search center pointed to by an integer motion vector and eight half-pixel positions in half pixel interpolation, and wherein the quarter-pixel refinement comprises searching one half-pixel position and eight quarter-pixel positions in quarter pixel interpolation, and wherein the one-eighth-pixel refinement comprises searching one quarter-pixel position and eight one-eighth-pixel positions in one-eighth pixel interpolation.

20. The system of claim 10, wherein in the event of data dependencies in processing the coding units across different rows of coding units of the frame of the video, the processing of a certain coding unit in a particular row and column is performed after the processing of another coding unit in a previous row and a particular column is finished by a different parallel pipeline.

* * * * *